United States Patent
Stegall et al.

[19]

[11] Patent Number: 5,873,284
[45] Date of Patent: Feb. 23, 1999

[54] CONTROL FOR PORTABLE POWER TOOL

[75] Inventors: Robert Stegall, Lake Villa; Frank Potucek, Fox Lake; William Kalnins, Maple Park, all of Ill.

[73] Assignee: Echo Incorporated, Lake Zurick, Ill.

[21] Appl. No.: 779,572

[22] Filed: Jan. 7, 1997

[51] Int. Cl.⁶ .................................................. G05G 1/21
[52] U.S. Cl. ............................................. 74/525; 74/544
[58] Field of Search ........................... 74/523, 524, 525, 74/543, 544, 545, 546, 547; 15/327.5, 410; 173/170

[56] References Cited

U.S. PATENT DOCUMENTS

| | | | |
|---|---|---|---|
| 1,870,403 | 8/1932 | Coffing | 74/547 X |
| 3,733,922 | 5/1973 | Tripp | 74/523 |
| 3,795,156 | 3/1974 | Neuscheler | 74/523 |
| 3,949,817 | 4/1976 | Rice | 74/544 X |
| 4,552,100 | 11/1985 | Kawaharazuka et al. | |
| 5,577,417 | 11/1996 | Fournier | 74/523 |

FOREIGN PATENT DOCUMENTS

| | | | |
|---|---|---|---|
| 43809 | 1/1982 | European Pat. Off. | 74/523 |
| 132405 | 6/1929 | France | 74/545 |
| 61492 | 5/1955 | France | 74/544 |
| 472503 | 3/1929 | Germany | 74/523 |
| 916258 | 8/1954 | Germany | 74/547 |

*Primary Examiner*—Charles A. Marmor
*Assistant Examiner*—MaryAnn Battista
*Attorney, Agent, or Firm*—Armstrong, Westerman, Hattori, McLeland & Naughton

[57] ABSTRACT

A portable tool having a frame, a power unit having a control that is operable to place the power unit in first and second different states, a control actuator that is operable to change the power unit from one of the first and second states into the other of the first and second states, and an arm connecting between at least one of the frame and power unit and the control actuator for supporting the control actuator in an operative position relative to the frame. At least a part of the arm has a plurality of degrees of freedom of movement relative to the frame to allow selective situation of the control actuator by a user.

19 Claims, 3 Drawing Sheets

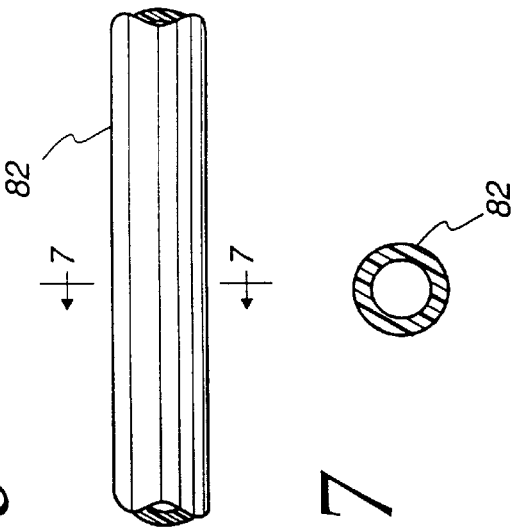
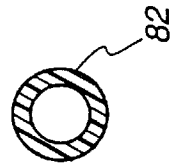
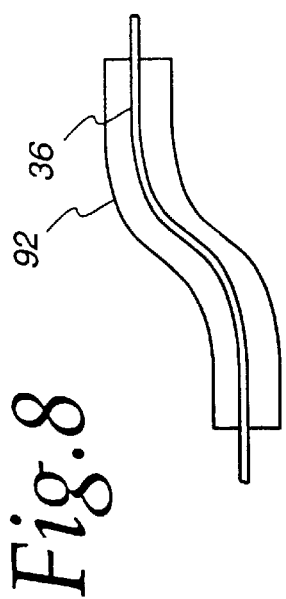
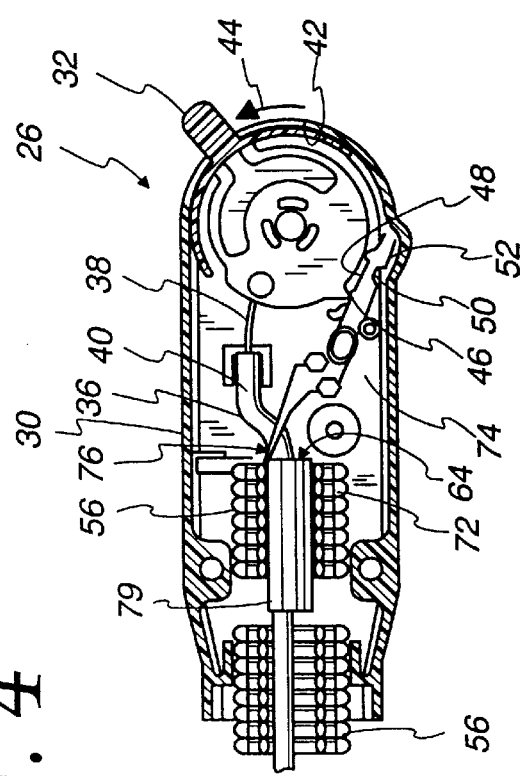
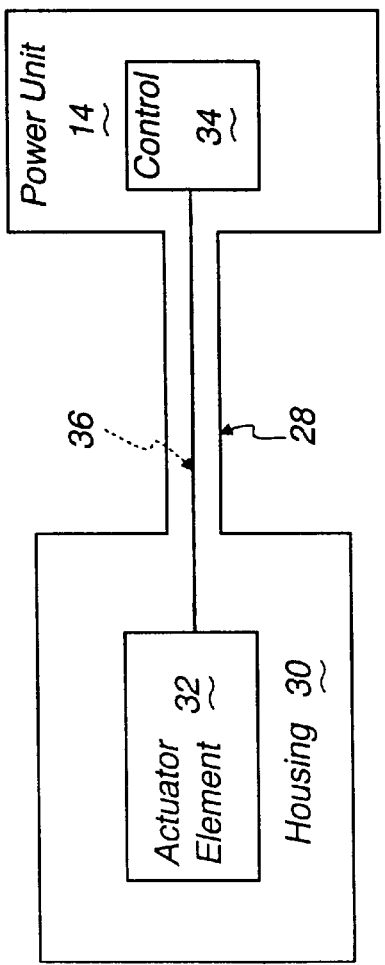

CONTROL FOR PORTABLE POWER TOOL

BACKGROUND OF THE INVENTION

1. Field of the Invention

This invention relates to tools that are operable through a power unit and, more particularly, to a control for selectively changing the state of the power unit.

2. Background Art

A wide range of power operated, portable tools are currently available for use in a wide range of environments. An exemplary tool construction employs a power unit that is either gas or electrically operated. The user supports the tool in an elevated, operating position through the use of spaced handles.

It is also known to construct such power tools using a "backpack" construction. This is a common configuration for commercial blower units. The frame carrying the power unit and other operating components is supported on user's back, thereby freeing both of the user's hands to operate controls for the power unit and appropriately orient an air discharge fitting.

To permit the user to control the back mounted power unit, it is known to project an operating arm on the frame to forwardly of the user's body and to locate and operate one or more actuators at the free end thereof. Typically, the arm projects forwardly and angularly outwardly between the user's torso and arm so that the actuator(s) at the free end can be accessed with the user's arm in a relatively comfortable orientation.

The arm carrying the actuator(s) is typically rigid and mounted movably to the frame to allow repositioning of the actuator(s) on the arm to suit the preference of the user. One typical mounting has a horizontal and laterally extending pivot point which results in the arm's tracing a conical surface as it is repositioned. This arm construction has been operatively effective, but has a number of drawbacks.

First of all, the available orientations of the actuator(s) at the end of the arm are limited. A predetermined angular relationship between the arm and the frame may not place the actuator(s) in the optimum position for all body sizes.

Further, this arm is prone to hanging up on vegetation and other objects around which the tool is commonly used. In use, the angularly oriented arm, in conjunction with the frame and the user's body, create a forwardly opening "V" shape which tends to funnel objects encountered into an entangled position at the base of the "V". Aside from the obvious inconvenience, this condition is potentially dangerous in that the user may, as result, become unbalanced and may fall and sustain an injury.

A further problem with this arm construction is that it is prone to breakage. The pivot connection gives the arm one degree of freedom. However, an impact imparted to the arm of a certain magnitude and in a certain direction may cause the arm to bend or break. Crews using this type of equipment often carelessly throw the tool into a flatbed vehicle commonly used in landscaping operations. If the initial drop of the power tool does not damage the arm, the tool might also shift during transportation as would have the same detrimental effect.

Aside from the potential damage to the arm, depending upon the construction of the actuator(s) at the end thereof and the attaching mechanism, the actuator(s) and/or the frame of the power tool may also be damaged through such impact.

SUMMARY OF THE INVENTION

In one form of the invention, a portable tool is provided having a frame, a power unit having a control that is operable to place the power unit in first and second different states, a control actuator that is operable to change the power unit from one of the first and second states into the other of the first and second states, and an arm connecting between the frame and the control actuator for supporting the control actuator in an operative position relative to the frame. At least a part of the arm has a plurality of degrees of freedom of movement relative to the frame to allow selective situation of the control actuator by a user.

In one form, the at least part of the arm is universally deformable to provide the plurality of degrees of freedom of movement.

In one form, the at least part of the arm is shape-retentive. The arm has an undeformed state which the arm assumes in the absence of an external force being applied to the arm.

The at least part of the arm can be made from a semi-rigid material that can be reconfigured to a desired shape in response to a predetermined force being applied thereto and will maintain the desired shape with the predetermined force removed therefrom.

The at least part of the arm may be a spring element, such as a coil spring bounding a channel.

A sheath can be provided in surrounding relationship to at least a part of the coil spring.

At least one control cable can be extended from the control on the power unit through the coil spring channel and to the control actuator. The control cable can be a mechanical or an electrical control cable.

The at least part of the control arm can be connected to the frame for pivoting movement around an axis.

In one form the portable tool further includes a housing upon which the control actuator is mounted, with the arm being a hollow tubular element that extends between the frame and the control actuator housing.

The portable tool can perform any of a number of different functions. In one form, the portable tool is a power blower with a harness for mounting the frame on the back of an operator.

In another form of the invention, a portable tool is provided having a frame and a power unit having a control that is operable to selectively place the power unit in first and second different states, a control actuator that is operable to change the power unit from one of the first and second states into the other of the first and second states, and an arm connecting between at least one of the frame and power unit and the control actuator for supporting the control actuator in an operative position relative to the frame. At least a part of the arm is repositionable from a first state to allow the control actuator to be selectively repositioned by a user. The at least part of the arm consistently returns to the first state in the absence of an external force being applied to the arm.

The at least part of the arm can be deformable and shape-retentive such that upon a deforming force on the arm being removed therefrom, the arm re-assumes the first state.

BRIEF DESCRIPTION OF THE DRAWINGS

FIG. 4 is an enlarged, cross-sectional view of the control actuator taken along line 4—4 of FIG. 3;

FIG. 5 is a schematic representation of a portable tool with a control actuator and arm, according to the present invention, operatively connected thereto;

FIG. 6 is a side elevation view of a part of a modified form of arm, according to the present invention;

FIG. 7 is a cross-sectional view of the arm part taken along line 7—7 of FIG. 6; and FIG. 8 is a side elevation view of a further modified form of arm part, according to the present invention.

DETAILED DESCRIPTION OF THE DRAWINGS

Figure 1:
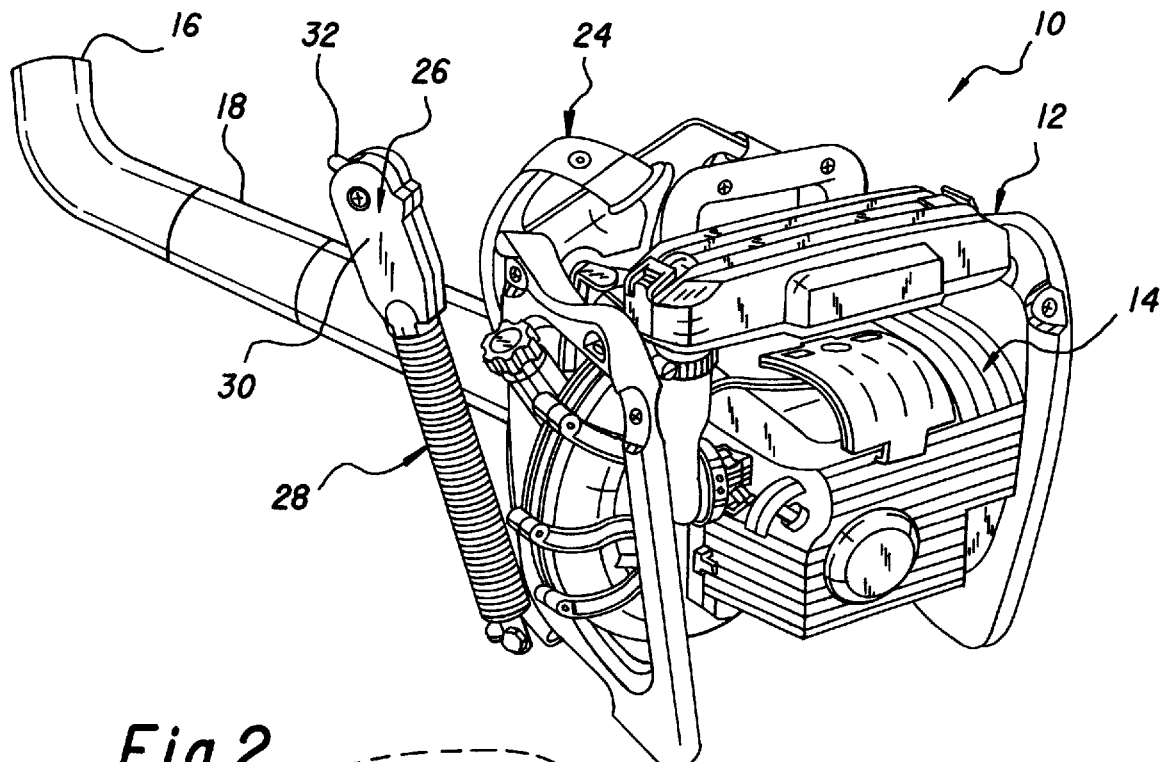
FIG. 1 is a rear and side perspective view of a backpack-type power blower unit with an arm, according to the present invention, mechanically and operatively connecting between a power unit and a control actuator for the power unit.
Figure 2:
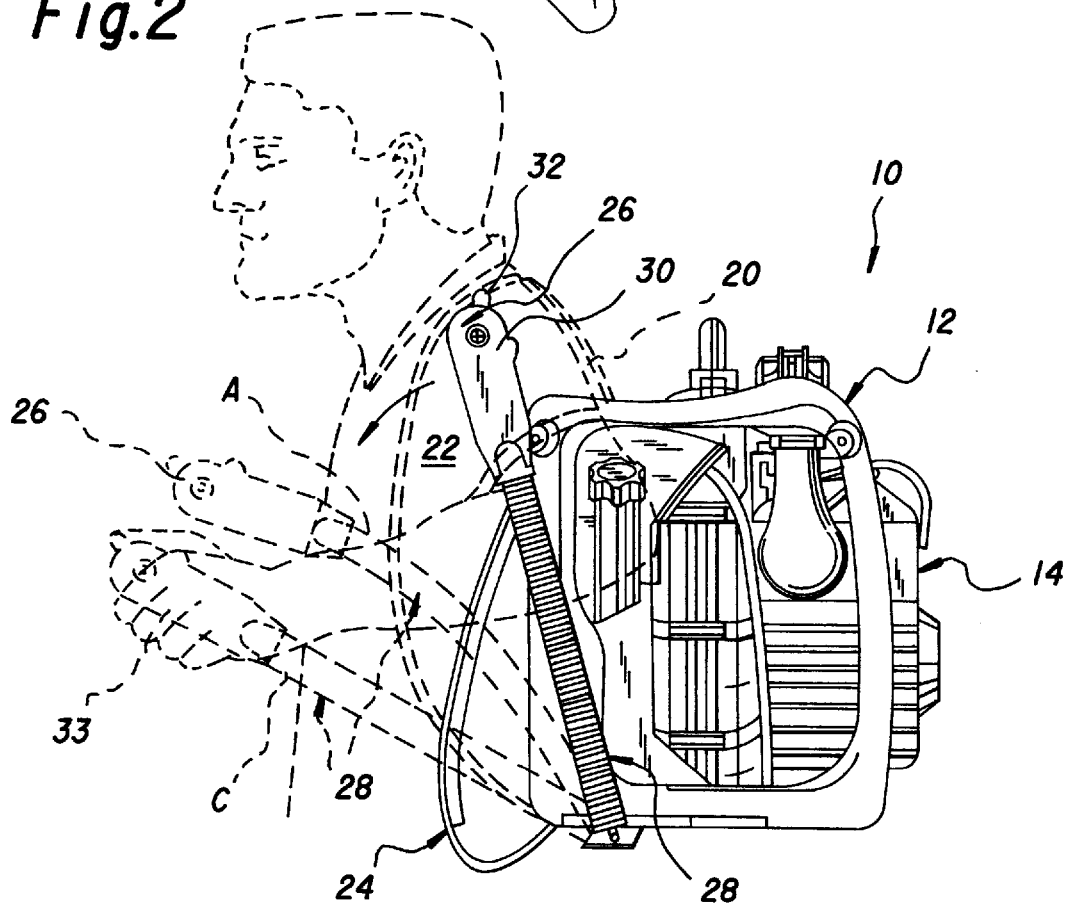
FIG. 2 is a side elevation view of the power blower unit of FIG. 1 with the arm shown in one operating position in an undeformed state in solid lines and in two different operating positions in phantom lines.

In FIGS. 1 and 2, a portable tool is depicted at 10 as one exemplary environment for the present invention. The portable tool 10 is a power blower that is designed to be supported on the back of a user.

More particularly, the power blower 10 has a frame 12 with a power unit 14 mounted on the frame 12. Through a well known and commercially available mechanism, operation of the power unit 14 causes incoming air to be accelerated and exhausted at high volume at the discharge end 16 of a repositionable, elongate nozzle 18.

The frame 12 is supportable on the back 20 of a user 22 through a conventional-type harness 24. With the power blower 10 in the operative position of FIG. 2, the nozzle 18 is conveniently manipulable by the right hand of the user, with the left hand of the user being available to operate an actuator 26 carried on an arm 28 projecting upwardly and angularly outwardly from the frame 12.

As seen in FIGS. 1–5, the actuator 26 has a housing 30 with an actuator element 32 thereon that is directly operable by the hand 33 of the user 22 while grasping the housing 30 to remotely operate a control 34 for the power unit 14 through an electrical or mechanical cable 36. The generically identified control 34 could be a choke, a throttle, a cut-out switch, a starting switch, a fuel control, or virtually any type of control 34 that is operable to change the state of the power unit 14.

Figure 3:
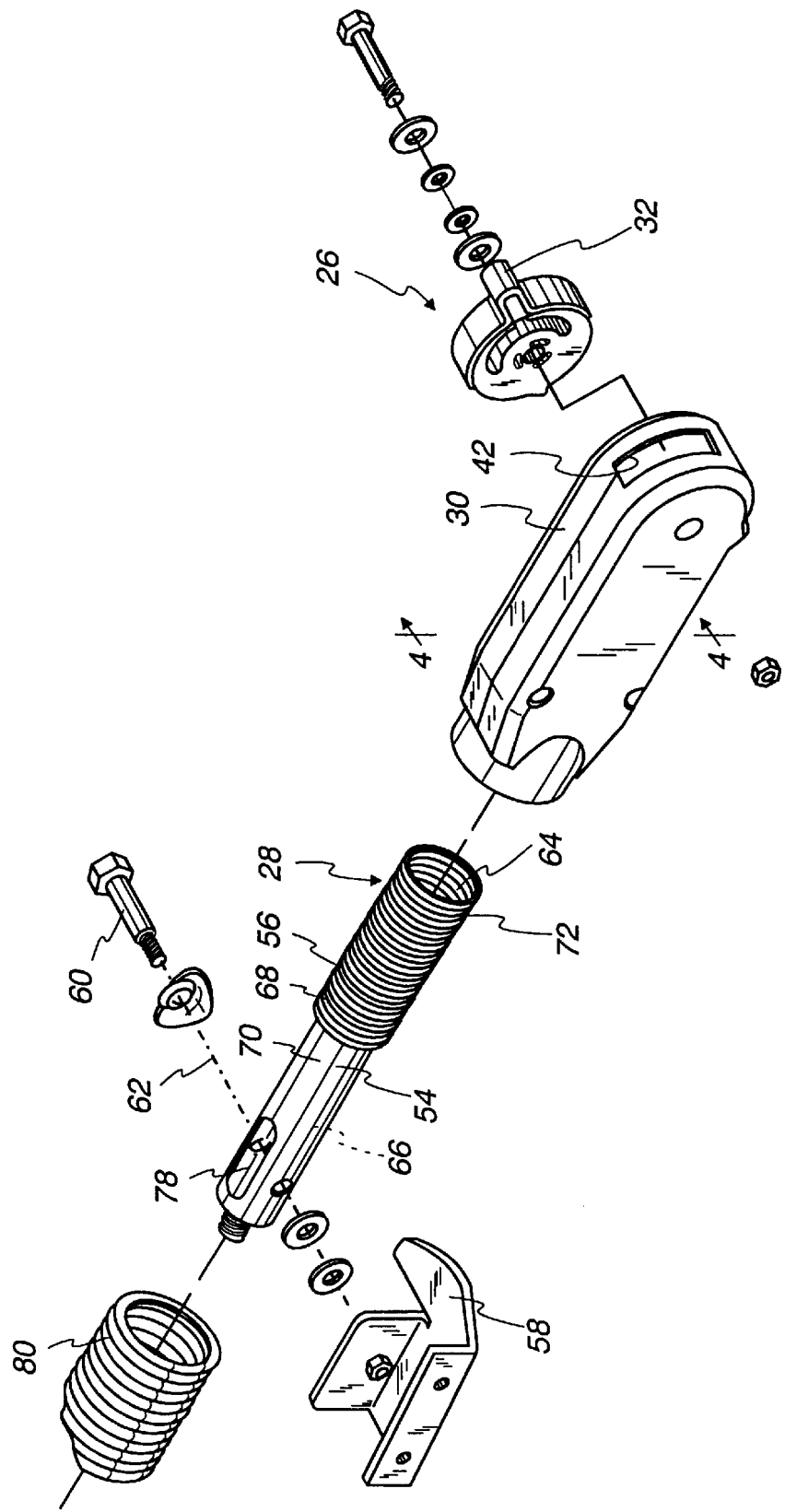
FIG. 3 is an enlarged, exploded, perspective view of the inventive arm and control actuator.

In FIGS. 3 and 4, the actuator element 32 is shown to be pivotable relative to the housing 30 to slide a center core element 38 within a sheath 40 on the cable 36. The control 34 is movable through an operating range, as determined by the dimensions of a slot 42 within the housing 30. In this case, the cable 36 operates a throttle control 34 for the power unit 14.

The actuator element 32 is also movable to shut off the power unit. By pivoting the actuator element 32 fully in the counterclockwise direction, as indicated by the arrow 44 in FIG. 4, a projecting finger 46 on the actuator element 32 cams a first conductive element 48 into contact with a raised portion 50 on a second conductive element 52, shorting the operating circuit and stopping the power unit 14.

The precise structures for the throttle control and a shut-off circuit are well known to those skilled in the art and are peripheral to the present invention.

The arm 28, according to the present invention, allows the user 22 to grasp the housing 30 to conveniently operate the actuating element 32. The arm 28 has a rigid base 54 and a reconfigurable part 56 connecting between the base 54 and the housing 30. In FIGS. 1–4, the reconfigurable part 56 is in the form of a coil spring made from a formed wire, with a constitution and diameter selected so that the spring 56 is shape-retentive but deformable under a predetermined force applied through the user to allow convenient reconfiguration of the arm 28. The spring 56 is selected so that reconfiguration can be effected with a non-exerting movement of the user's arm. With this arrangement, the arm 28 will also bend back to pass over an obstruction that would otherwise interlock with or snag on the arm 28. The spring 56 also absorbs impacts that could otherwise potentially damage the arm 28 and/or frame 12. Thus, the arm 28 can be made to any convenient length without fear of the arm 28 becoming detrimentally obtrusive in use and during transportation.

The arm 28 normally has an undeformed, operative state shown in solid lines in FIG. 2. By grasping the housing 30, the user 22 is allowed to conveniently deform the arm 28 by bending the spring 56 as shown in the position "A" in FIG. 2. By releasing the arm 28 from the "A" position in FIG. 2, the spring 56 re-assumes the solid line state of FIG. 2.

The base 54 is connected to a bracket 58 on the frame 12 through a bolt 60 so that the base 54 is pivotable relative to the bracket 58 around an axis 62. Through this pivot arrangement, the operator 22 can reposition the arm 28 from the solid line position in FIG. 2 to the position shown in phantom at "C" in FIG. 2. A spring can be used to normally bias the arm 28 from the "C" position back to the solid line state of FIG. 2. The arm 28 can be pivoted to the solid line state for facilitated storage.

Accordingly, in a preferred form, the invention contemplates at least two degrees of freedom of movement for the arm 28, i.e. the pivoting about the axis 62 and bending. In this case, the degrees of freedom of movement are infinite in light of the universal reconfiguration capability of the spring 56.

The spring 56 bounds a channel 64. The base 54 is also hollow to define a channel 66 extending lengthwise therethrough. With the spring 56 connected to the base 54 by placing one spring end 68 grippingly around the base end 70, a continuous passageway is defined by the channels 64, 66. The opposite end 72 of the spring 56 is captively maintained within the housing 30, as shown clearly in FIG. 4. With the spring 56 operatively connected as in FIG. 4, the channels 64, 66 communicate with a space 74 within the housing 30. Accordingly, the cable 36 and a cable 76 can be threaded through the channels 64, 66 and through an opening 78 in the base 54 to the control 34 on the power unit 14. As such, the base 54 and spring 56 cooperatively define a protective covering for the cables 36, 76 threaded therethrough. A compressible spacer 79 within the channel 64 keeps the cables 36, 76 centered therewithin to avoid detrimental contact between the spring 56 and cables 36, 76.

To avoid a pinching action between the turns of the spring 56, as might cause discomfort or injury to the user, a flexible sheath 80 is placed surroundingly over the base 54 and spring 56 between the bracket 58 and the housing 30. The sheath 80 can be made from plastic or any material that flexes to accommodate reconfiguration of the arm 28.

As an alternative to the spring 56, a flexible tube 82 is shown in FIGS. 6 and 7 and is useable to define part of the arm 28. The tube 82 may be made from shape-retentive rubber or other semi-rigid material that flexes universally under a predetermined force and assumes its undeformed state once the force is released.

In FIG. 8, a modified form of arm 28 is shown. The arm 92 is made from a material that can be readily universally reconfigured by a user to situate the actuator element 32 thereon in a comfortable operating position. The arm 28 is hollow or solid and made from a semi-rigid material or element that will maintain a reconfigured state. That is, if the user reconfigures the arm from a straight state into the configuration shown in FIG. 8, through the application of a predetermined force, the FIG. 8 shape will be maintained once the arm 28 is released, i.e. the force is removed, by the user. The structure to permit this is well known to those skilled in the art and is currently being employed, as by Black and Decker Company and others, to make flashlights. If the arm 28 is solid, the cable 36 can be attached along the outside of the arm 28, as shown in FIG. 8.

The foregoing disclosure of specific embodiments is intended to be illustrative of the broad concepts comprehended by the invention.

We claim:

1. A portable tool, comprising:

a frame;

a power unit having a control that is operable to selectively place the power unit in first and second different states;

a control actuator that is operable to change the power unit from one of the first and second states into the other of the first and second states; and an arm pivotally connected to the frame for supporting the control actuator in an operative position relative to the frame, the arm including a reconfigurable part to allow selective situation of the control actuator by a user.

2. The portable tool according to claim 1, wherein the reconfigurable part of the arm is made of a semi-rigid material that is reconfigured to a desired shape by applying a predetermined force thereto and that maintains the desired shape when the predetermined force is removed.

3. The portable tool according to claim 1 wherein the portable tool comprises a power blower.

4. The portable tool according to claim 3, including a harness for mounting the frame on the back of the user.

5. The portable tool according to claim 1 wherein the portable tool further comprises a housing upon which the control actuator is mounted and the arm comprises a hollow tubular element that extends substantially fully between the frame and the control actuator housing.

6. The portable tool according to claim 5, further comprising a sheath that surrounds the hollow tubular and extends substantially fully between the frame and the control actuator housing.

7. The portable tool according to claim 6, wherein the hollow tubular element comprises a coil spring.

8. The portable tool according to claim 1, wherein the reconfigurable part of the arm is made of a shape-retentive element which assumes an undeformed state in the absence of an external force being applied to the arm.

9. The portable tool according to claim 8 wherein the reconfigurable part of the arm comprises a spring element.

10. The portable tool according to claim 9, wherein the spring element comprises a coil spring bounding a channel and there is at least one control cable extending from the control on the power unit through the coil spring channel and to the control actuator.

11. The portable tool according to claim 10 wherein the control cable is a mechanical control cable.

12. The portable tool according to claim 10 further comprising a sheath which surrounds at least a part of the coil spring.

13. A portable tool, comprising:

a frame;

a power unit having a control that is operable to selectively place the power unit in first and second different states;

a control actuator that is operable to change the power unit from one of the first and second states into the other of the first and second states; and an arm supporting the control actuator in an operative position relative to the frame, the arm including a repositionable part that is repositionable from a first state to allow the control actuator to be selectively repositioned by a user and that returns to the first state in the absence of an external force being applied to the arm.

14. The portable tool according to claim 13, wherein at least part of the arm is connected to the frame for pivoting movement around an axis.

15. The portable tool according to claim 13, wherein the repositionable part of the arm is deformable and is shape-retentive such that upon a deforming force on the arm being removed therefrom, the arm re-assumes the first state.

16. The portable tool according to claim 15, wherein the repositionable part of the arm comprises a hollow, tubular element.

17. The portable tool according to claim 16 wherein there is at least one control cable extending from the control on the power unit through the hollow tubular element and to the control actuator.

18. The portable tool according to claim 16 wherein the tubular element comprises a coil spring.

19. The portable tool according to claim 18 further comprising a sheath that surrounds the coil spring.

\* \* \* \* \*

UNITED STATES PATENT AND TRADEMARK OFFICE
CERTIFICATE OF CORRECTION

PATENT NO. : 5,873,284
DATED : February 23, 1999
INVENTOR(S) : STEGALL et al.

It is certified that error appears in the above-identified patent and that said Letters Patent is hereby corrected as shown below:

On the title page:
Item [73], change "Echo Incorporated, Lake Zurick, Ill." to --Kioritz Corporation, Ohme-shi, Japan --.

Signed and Sealed this

Seventeenth Day of August, 1999

Attest:

Attesting Officer

Q. TODD DICKINSON

Acting Commissioner of Patents and Trademarks